(12) United States Patent
Khan et al.

(10) Patent No.: US 11,556,787 B2
(45) Date of Patent: Jan. 17, 2023

(54) AI-ASSISTED DETECTION AND PREVENTION OF UNWANTED NOISE

(71) Applicant: International Business Machines Corporation, Armonk, NY (US)

(72) Inventors: Naweed Aghmad Khan, Johannesburg (ZA); Toby Kurien, Midrand (ZA); Michael S. Gordon, Yorktown Heights, NY (US); Komminist Weldemariam, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 343 days.

(21) Appl. No.: 16/884,278

(22) Filed: May 27, 2020

(65) Prior Publication Data

US 2021/0374515 A1  Dec. 2, 2021

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ............ G06N 3/08; G06N 3/04; G06N 3/084; G10K 11/17827; G10K 11/17873; G10K 2210/1081; G10L 21/0316; G10L 21/0356; G10L 25/30; G10L 25/63; H04R 1/1083; H04R 2430/01; H04R 2460/01
See application file for complete search history.

(56) References Cited

U.S. PATENT DOCUMENTS

| | | | |
|---|---|---|---|
| 8,571,226 B2 | 10/2013 | Isberg | |
| 2009/0226023 A1 | 9/2009 | Akino | |
| 2010/0172510 A1 | 7/2010 | Juvonen | |
| 2011/0222700 A1 | 9/2011 | Bhandari et al. | |
| 2014/0219462 A1* | 8/2014 | Usher | H04R 1/1083 |
| | | | 381/56 |
| 2015/0351655 A1 | 12/2015 | Coleman | |
| 2016/0093281 A1 | 3/2016 | Kuo et al. | |
| 2016/0330537 A1 | 11/2016 | Barrentine et al. | |
| 2017/0249855 A1 | 8/2017 | Gazzaley | |
| 2018/0190298 A1 | 7/2018 | Huang et al. | |
| 2019/0012599 A1* | 1/2019 | el Kaliouby | G06V 10/80 |
| 2019/0088366 A1 | 3/2019 | Vaughan et al. | |
| 2020/0402493 A1* | 12/2020 | Barnes | G10K 11/17827 |

* cited by examiner

*Primary Examiner* — Yogeshkumar Patel
(74) *Attorney, Agent, or Firm* — Scully, Scott, Murphy & Presser, P.C.; Shimon Benjamin

(57) ABSTRACT

A signal representing a sound can be received. A machine learning model can be run to identify that the sound triggers a reaction in a user hearing the sound. A preventive action can be automatically activated to mitigate the reaction. The user's reactions can be monitored. Responsive to determining that the user's reaction has been mitigated or suppressed, the preventive action can be deactivated. The machine learning model can be retrained using at least the signal as new training data.

20 Claims, 6 Drawing Sheets

AI-ASSISTED DETECTION AND PREVENTION OF UNWANTED NOISE

BACKGROUND

The present application relates generally to computers and computer applications, and more particularly to Artificial Intelligence (AI)-assisted detection and prevention of unwanted noise sounds for aiding in noise sensitivity.

Undesired noise or sound can be bothersome to some individuals, for example, those who have sensitivity to noise. Such noise can also trigger certain reactions in individuals. For instance, elevated noise levels such as those produced by a crying sound and/or other loud or sudden noise in the vicinity can trigger reactions in individuals such as crying along, trying to cover their ears, or another reaction. Some settings such as a day care center and public places like parks and malls can be more prone to occurrences of elevated levels of noise.

BRIEF SUMMARY

A computer-implemented method, in one aspect, can include receiving a signal representing a sound. The method can also include running a machine learning model to identify that the sound triggers a reaction in a user hearing the sound. The method can further include automatically activating a preventive action to mitigate the reaction. The method can also include monitoring the user's reactions. The method can also include, responsive to determining that the user's reaction has been suppressed, deactivating the preventive action. The method can further include retraining the machine learning model using at least the signal as new training data.

A system, in one aspect, can include a sensor device operable to detect signals representing a sound. A processor can be coupled with the sensor. The processor can be operable to receive a signal representing a sound detected by the sensor. The processor can also be operable to run a machine learning model to identify that the sound triggers a reaction in a user hearing the sound. The processor can also be operable to automatically activate a preventive action to mitigate the reaction. The processor can also be operable to monitor the user's reactions. The processor can also be operable to, responsive to determining that the user's reaction has been suppressed, deactivate the preventive action. The processor can also be operable to retrain the machine learning model using at least the signal as new training data.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
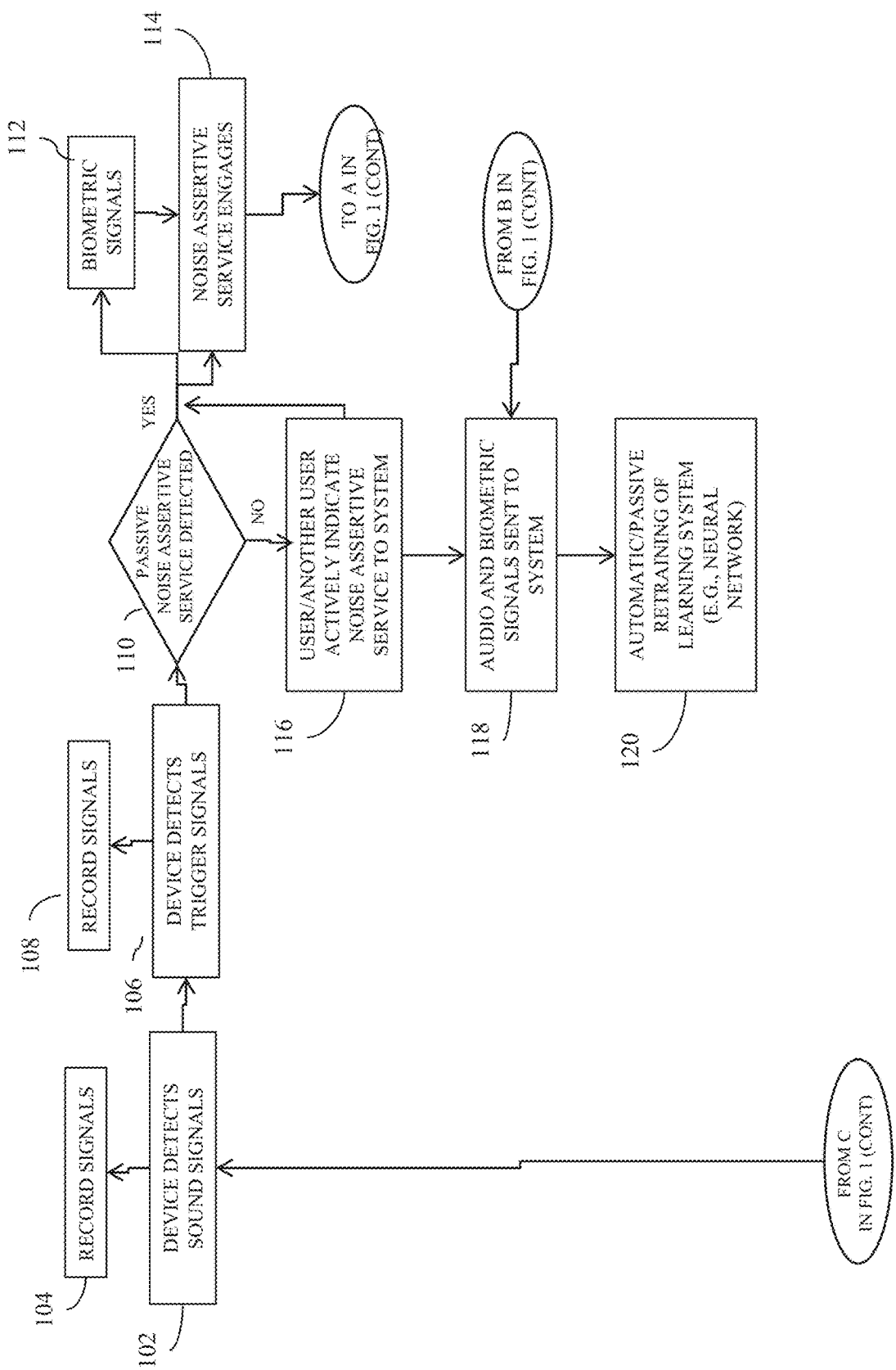
FIG. 1 is a diagram illustrating an example process in an embodiment.
Figure 1:
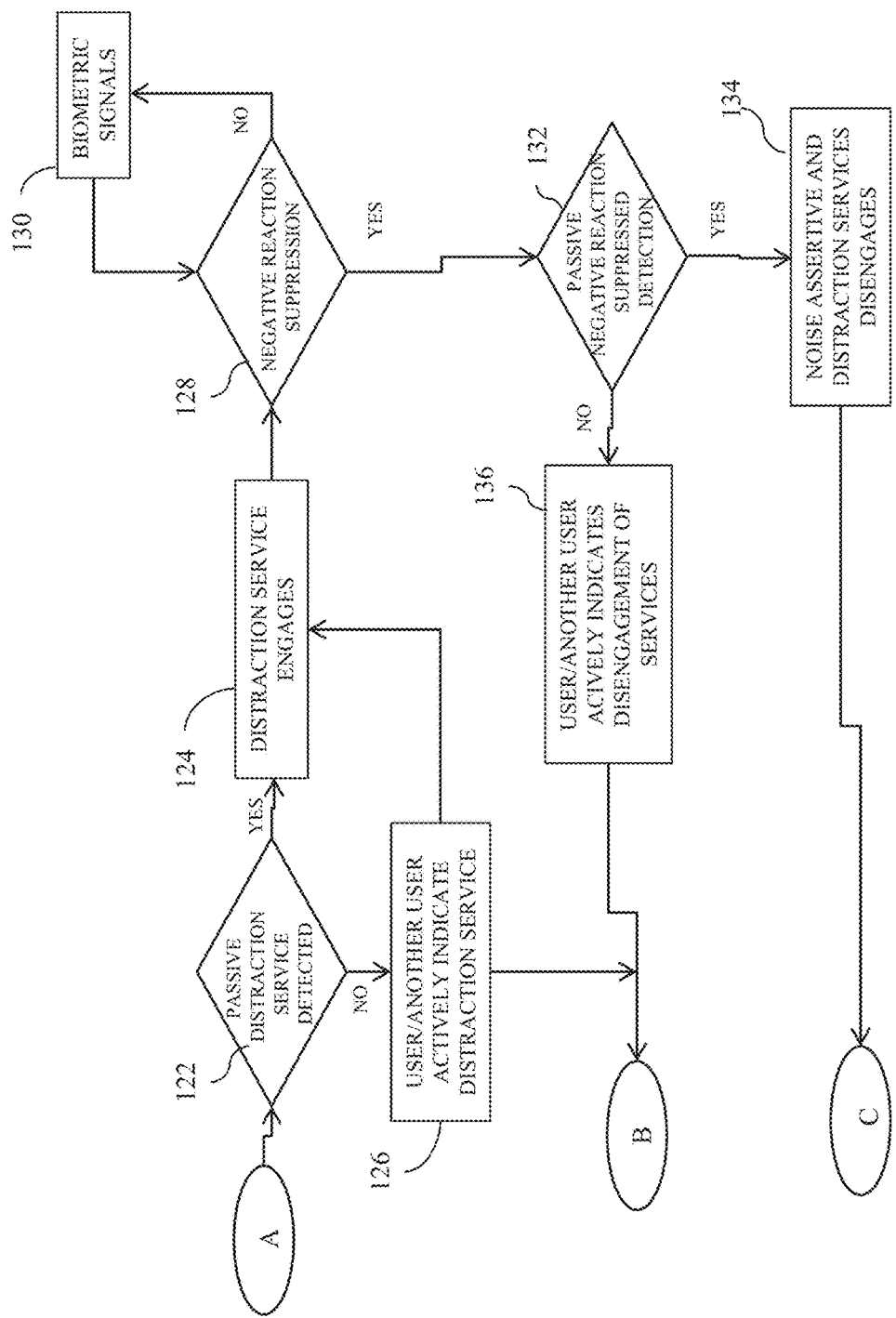

A system, method and technique are described for detecting, predicting and preventing unwanted noise sounds and levels, which may create triggers or reactions in an individual, and also for providing noise assertive services and attention diversion services for the individual. Examples of noise sounds may include, but are not limited to, cries, loud talking, construction sounds, and/or others. Examples of noise assertive services may include, but are not limited to, activating a variable sound valve, active noise cancellation, and/or others. Examples of attention diversion services may include, but are not limited to, increasing the volume of a television (TV) or another media device, playing alternative sounds on a handheld device, turning on a seatback (e.g., on a plane) or overhead screen, and/or others.

A system may include one or more computer-implemented components, for instance, implemented and/or run on one or more processors, e.g., hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

The system, for instance, may predict and prevent unwanted sounds and noise levels, which may create triggers (e.g., emotional triggers such as elevated heart rates, additional crying, etc.) when an individual with noise sensitivity is within the auditory or visual vicinity of the unwanted noise. The system may apply a set of noise assertive services such as real-time noise cancellation by over-ear headphones, etc., and distraction services to nearby connected devices, e.g., home TV set, home automation systems, in-flight entertainment systems, etc., with automatic learning provided by training signals when the sensitive individual or another individual interacts directly with the headphones or a second controlling device (e.g., smartphone, etc.).

In an embodiment, the system analyzes specific individuals with noise sensitivities and their reaction to unwanted noises, specific sounds that cause emotional triggers for them such as elevated heart rates, crying, flailing, and/or another reaction. The system may use noise assertive and/or attention diversion services in order to calm an individual's reaction. The system may use a storage buffer to facilitate an automated prediction of interaction with noise assertive and/or attention diversion services, and offer adaptive learning from training signals that are facilitated by interaction with a headphone device or a secondary parental control device.

FIG. 1 is a diagram illustrating an example process in an embodiment. At 102, a sensor device such as a wearable device can detect sounds or sound signals within an environment in the vicinity of a user. For example, the user may be wearing the sensor device that detects sounds. The sensor device may include or be coupled to a processor. The processor may be coupled to a memory device. The processor receives the detected sound and may store it in the memory device and for example, also record the detected sound, shown at 104. The processor may also transmit the sound to another computer processor, for example upload to a remote computer system, such as the cloud computer. An example of such a sensor device is a headphone. The headphone can be equipped with a computer processor, which may also include an artificial intelligence (AI) capability. For instance, an AI software or hardware circuit module may be implemented, such as a neural network chip, within such a headphone. Such a headphone can provide passive sound reduction by the design of and materials chosen for the ear seals on the headphones, and active noise canceling services (e.g., generating a signal that reduces or cancels noise), which can facilitate reduction of unwanted noises. Noise canceling headsets sample and playback the ambient noise out of phase so that the amplitude of the repetitive noise is reduced. For instance, the headphone or another device can automatically activate one or more noise mitigating actions or services. In another aspect, a user may activate one or more noise mitigating actions or services. In an embodiment, a "passive" service includes controlling devices, programmatically. For example, a mechanical sealing of noise reducing materials can be controlled programmatically with a valve. A passive service is considered "passive" in that no active signals are generated to reduce noise. In an "active" service or active cancellation, input signals can be identified and out-of-phase signals can be actively generated out-of-phase to reduce the input noise.

At 106, the processor may determine that the detected sound triggers a reaction in the user. For instance, based on historic data associated with user behavior, the processor may predict that the sound would trigger a reaction. For example, an artificial neural network (also referred to as a neural network) can be trained using historic data as training data. Features of different sounds and past reactions of the user to the different sounds can be input as training data to train the artificial neural network. Another machine learning algorithm can be used. The detected sound can be input to the trained neural network, for the neural network to classify or determine whether the detected sound would trigger a reaction in the user.

In an aspect, the user may display a reaction such as crying or making the user's own sound, responsive to the detected sound. Such reactive signals can be recorded, for example, stored in local memory of the sensor device or processor coupled to the sensor device, and/or uploaded to another computer such as a server and/or a cloud computer, for example, as shown at 108.

At 110, it is determined whether a passive noise assertive service is detected. For example, the sensor device coupled with a processor may automatically perform a passive noise assertive service. For instance, considering that the sensor device is a headphone with an AI chip or a processor having an AI component, the headphone can automatically close its sound valve, if available, based on detecting an unwanted sound, which the headphone determines would trigger a reaction, e.g., negative or adverse reaction from the user. In this context, a sound valve is a shutter on the outside or inside of a headset. The sound valve can be opened or closed either manually or automatically responsive to an input signal. The sound valve supplements the passive noise reduction offered by the ear seals and their material on the headset.

Additionally, the processor (e.g., AI chip) can detect if there is someone speaking nearby, e.g., in the direction of the wearer. In this case, if the unwanted sound in the background is still persistent, the processor can beep in the wearer's ear to let the wearer (user) know that someone is trying to talk to wearer. This can be done if the speaker says the person's name, or continues the conversation. In the case, in which the unwanted sound is no longer there, the processor can open the sound valve to let the sound through. For instance if a user is listening to music and wearing a noise cancelling headset and someone is attempting to speak to the user, and speaks the user's name, then the user can either manually or automatically open the sound valve so that the user can hear what is being said.

At 112, user signals such as user biometric signals can be monitored continuously. Monitoring can be done with a permission of the user and/or user guardian. In an example scenario, the user with noise sensitivity may hear loud unwanted sounds within an environment which may cause the user to become emotionally upset. Through the use of biometric signals, for instance, heart rate, blood pressure, facial features, or crying, an emotional triggering may be identified. For instance, the processor may communicate with one or more other sensor devices such as a heart rate monitor, blood pressure monitor, sound monitor, or a camera to obtain biometric signals of the user. In another aspect, if no such other sensor devices are available, the processor may use the current sensor device (e.g., headphone, which includes a built-in microphone) to detect any sounds the user may be making such as crying, yelling or another sound.

If the trigger (event causing the negative behavior in the user with noise sensitivity) is detected based on the monitored biometric signals of the user, one or more noise assertive services can be engaged at 114, along with continuous monitoring of the biometric signals at 112. For example, the headphone may activate a set of noise assertive services such as real-time noise cancellation to reduce the amplitude of repetitive noise sources. For example, when an undesired noise is detected, the headphone or the processor may capture the repetitive sounds, for instance that of a crying sound nearby.

At 110, if it is determined that the passive noise assertive service is not engaged, another user such as a user's guardian, a day care provider, or another, may also indicate the engagement of this service through another user's own device at 116. At 118, audio or noise signals (e.g., detected at 102) and user biometric signals (e.g., detected similarly as described with reference to 112) can be sent to the processor to retrain the passive noise assertive service to learn to engage in such environments. For example, at 120, the neural network or another AI model can be retrained with this additional data as training data.

At 122, a passive distraction service may also be detected, which engages in a distraction in an embodiment, at 124. For instance, in addition to engaging a passive assertive service, which may be detected at 110, the processor may engage a passive distraction such as turning on a nearby TV, playing alternative sounds on a handheld device, changing the channel of a seatback or overhead screen, and/or other distracting action. For example, the processor may automatically communicate with one or more other devices such as the TV, handheld device (e.g., a mobile phone), another wearable device, to activate one or more of those devices. If no passive distraction devices or services are available, at 126, such distraction can be actively engaged by another user such as the guardian, for example, via the guardian's own device, which may communicate with one or more of the other devices.

At 128, the processor may detect or identify whether the user with noise sensitivity is no longer reacting negatively, for example, by detecting that the user's biometric signals 130 (e.g., heart rate, blood pressure, facial features, frequency of crying or sobbing, behavior, etc.) are returned to a threshold level or meets a threshold level, which for example represents a normal state for the user. If it is determined that the user is continuing to react negatively, noise assertive service and/or distraction service can be modified to provide additional noise assertions and/or distractions that may further attempt to suppress the user's negative reaction. For instance, the processor may increase the volume of the TV, change the station, and/or play a different video. In an aspect, the degree of noise cancellation on the noise cancellation headset can be increased, e.g., if it were not already maximized. Additionally, other distraction methods (e.g., increasing the volume of the TV, changing the station, playing a different video) can be further activated.

At 132, it is determined whether passive negative reaction suppression is automatically activated. A correct detection that the user stopped the negative behavior may disengage all services activated after the triggering sound was first heard by the user, for example, at 134. If such automatic suppression is not engaged, at 136, another user such as the guardian, day care provider or another, may actively disengage all services from their own device. For example, another user's device may communicate with one or more devices providing noise assertive service and/or distraction.

In an embodiment, one or more neural network or another machine learning model can be retrained or updated with new training labels, which may include, for example, all active signals presented by the user device (e.g., at 102 and 108) and/or another user's device (e.g., guardian device, e.g., at 118). In another aspect, different distraction methods can be applied (e.g., at 130), and the user's reaction to the different methods can be used to train an additional neural network or another machine learning model, for predicting a type of mitigating action for a particular user given an unwanted noise.

In another embodiment, actively engaging a noise assertive service, for example, shown at 116, actively engaging a distraction method, for example, shown at 126, and/or actively disengaging of the noise assertive service and/or distraction method at 136, can be performed by the user, for example, by the user's device controlled by the user interacting with the sensor device such as the headphone. For example, active engagement can be performed by the user, and/or another user.

In one embodiment, the processor may learn to modify the effect of loud noise levels by altering the device. For example, the degree of noise cancellation can be applied in increments, e.g., providing a variable noise cancellation effect. The unwanted noise (triggering sound) can be partially canceled instead of being nearly completely attenuated. In this way, the processor can also teach the user with noise sensitivity to become accustomed or used to undesired noises and react less negatively to triggering noises in the future. In this way, the processor can also determine a specific tolerance level of the user, which can be further used to train a neural network that predicts the user's reaction to a noise or sound or sets of noises or sounds.

In another embodiment, the system and/or method described herein can be used to detect unwanted, naturally-occurring, repetitive sounds, and offer noise assertive and distraction services to prevent an individual or another entity with noise sensitivity from reacting negatively to the noise. An example of a naturally-occurring sound is rain striking the roof of a car. In yet another embodiment, the system and/or method can be used to detect unwanted, unnaturally-occurring, repetitive sounds such as a sound from a leaf-blower, construction sounds, a vacuum machine, fireworks, food-processor, etc., and provide or activate noise assertive and distraction services to prevent the individual or entity with noise sensitivity from reacting negatively to the noise. An individual or entity can include a human person or another entity such as a dog or another animal with noise sensitivity. For example, some dogs or other animals may be hyper-sensitive to the noise from fireworks, car horns and/or other noises.

The system, e.g., the user's device such as the headphone can continue to listen to sounds in the vicinity of the user and iterate the process described above. The user's device can have such functionality activated, and a user or another person, such as a parent, guardian or teacher can control whether such functionality can be activated or deactivated (e.g., turn on or off).

The system and/or method in an embodiment can apply a set of noise assertive services such as real-time cancellation by over-ear headphones in order to calm the user. For instance, the system may activate actions or services such as opening or closing the sound valve, or implementing various degrees of active noise cancellation, as needed. The system may use an on-device storage buffer to facilitate automated prediction of interaction with noise assertive and/or attention diversion services and offer adaptive learning from training signals that are facilitated by interaction with the headphone device and/or a secondary control device (e.g., guardian or another user device).

The system may suppress the occurrence of emotional reactions by employing a passive negative reaction suppression or automatic negative reaction suppression methodology. The system can revert the device operation to the normalized operation prior to the negative reaction triggering sound, e.g., once the negative reaction is suppressed. The system can also retrain passive detectors (e.g., a neural network) through the use of active signals provided by the user and/or another user's control device. The system may also analyze a range of noises for their amplitude, frequency spectra and duration. The system may also pair the device, e.g., headphone, with another user's device such as the guardian's device, responsive to detecting a negative reaction trigger from the user, e.g., caused by the unwanted sound. In that way, both the user with the noise sensitivity and the other user may, for instance, listen to the same music, television (TV) show, podcast, etc.

The system may predict and prevent negative reaction triggers (such as elevated heart rates, or another reaction) in a user, e.g., when an unwanted sound and noise level is detected within the auditory vicinity of the user, e.g., by applying a set of noise assertive services (such as real-time cancellation by over-ear headphones, etc.) and distraction services to nearby connected devices (home TV set, home automation systems, in-flight entertainment systems, etc.), with automatic learning provided by training signals, e.g., when the user with noise sensitivity and/or another user such as the guardian interacts directly with the user's device such as a headphone or a second controlling device (e.g., smartphone, etc.). By way of an example, such an interaction may be for the user to place their palms on a touch sensitive panel located on the side of the headphones, to decrease the sound levels heard by the wearer. Another example interaction may be for the guardian of the device wearer to decrease the volume of the noise (by increasing the level of noise cancellation at the user's headphones) using a Bluetooth paired smartphone device that has cloud-based or on-device variable noise cancellation controls.

Figure 2:
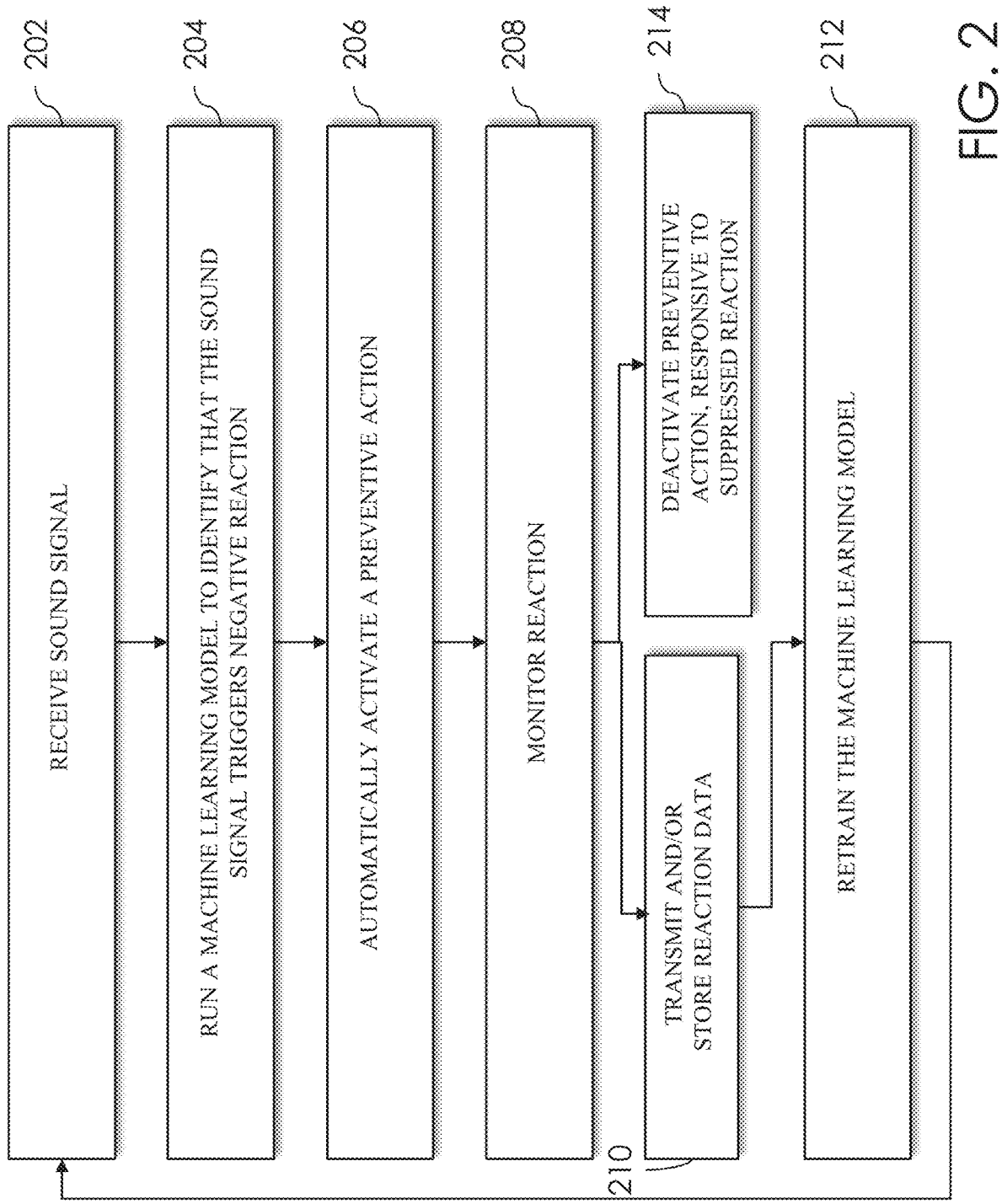
FIG. 2 is a diagram illustrating a method in one embodiment.

FIG. 2 is a diagram illustrating a method in one embodiment. The method can be implemented on or by one or more computer or hardware processors. At 202, a sound or noise signal is received. For example, a device or a sensor device such as a headphone or headset, or another wearable device worn by a user can detect a sound occurring in the vicinity of the user.

At 204, it is determined or predicted as to whether the sound is an unwanted sound, for instance, which would trigger a negative reaction in a user with noise sensitivity. This sound may be determined as similar to previous heard trigger noises and subsequently predicted to be an unwanted sound. A machine learning model, for example, a neural network trained to predict whether a sound would trigger a negative reaction in a user, can be run to predict whether this sound is unwanted, e.g., the user would react negatively to the sound. For instance, the neural network can be trained based on past or historical data representing an input/output relationship between one or more features of the sound and the user's reaction to it. This model may be optimized to detect and flag unwanted sounds as quickly as possible (minimizing the amount of time it takes between hearing the unwanted signal and flagging it), allowing the device to filter out unwanted noises as quickly as possible, which may be even before the user can register the sound as being an unwanted noise. In an embodiment, such neural network can be trained per a specific user. In another embodiment, a neural network can be trained, which may apply to a number of users, e.g., users having similar characteristics.

Examples of negative reactions can include, but are not limited to, the user making reactive sounds such as crying or another sound, and/or physical indications such as heart rate change, and/or others.

At 206, the method can include automatically activating a preventive action. An example of the preventive action can include generating a canceling sound signal that partially or nearly fully cancels the received sound signal and playing the sound to the user via the user's device. For example, the user's headphone or headset can play the canceling sound such that the user hears a greatly attenuated version of the unwanted sound. Another example of the preventive action can include activation of the sound valve, so that the some of the sound is blocked. Another example of the preventive action can include communicating with one or more other devices, e.g., in the vicinity of the user, to activate one or more functions of the one or more device, for example, such as turning on a telephone, playing a music on a smartphone device, and/or others. The method can also include pairing the user's device with another user's (e.g., a guardian) device so that they both listen to the same music, TV show or podcast.

At 208, the user's reactions are monitored, e.g., continuously. Monitoring can be performed, for example, based on obtaining prior permission, e.g., from the user or the user's guardian. For example, any sound the user makes, the user's biometrics and/or physiological state are measured and monitored. Sensor devices can be employed to detect and monitor the user's reactions. This can be useful to gauge the effectiveness of the assistive services and can provide feedback for training the machine learning tools.

At 210, any reactions detected from the user responsive to the user hearing the unwanted sound, e.g., prior to the preventive action applied, can be transmitted or stored, e.g., so that the information can be used to retrain the neural network.

At 212, the neural network can be retrained using the new data, the unwanted sound and the user's reaction. For example, features from the current unwanted sound and the current user's reaction (e.g., prior to the preventive action), which are recorded or saved, can be used as additional data or new data for training the neural network.

At 214, responsive to determining that the user's negative reactions have been suppressed, the preventive actions can be deactivated.

The method can be repeated, for example, listening for next possible sound in the vicinity of the user.

Figure 3:
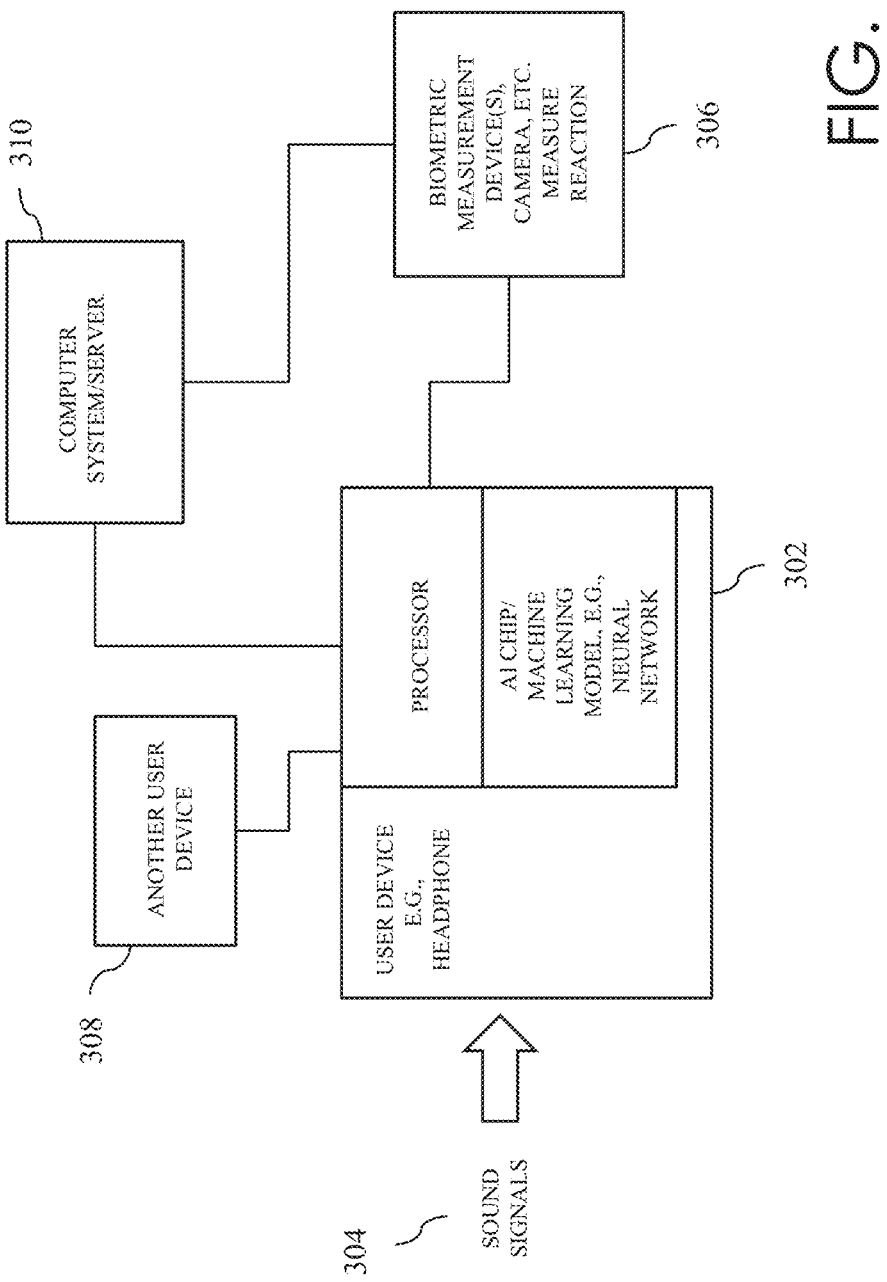
FIG. 3 is a diagram illustrating component overview of a system in an embodiment.

FIG. 3 is a diagram illustrating component overview of a system in an embodiment. A user or sensor device 302 can be coupled with a processor and implement or execute functions or methods described herein. The device also can include memory coupled with the processor. For example, the sensor device coupled with a processor 302 can be a headphone. The device 302 can include a microphone and a speaker or like devices such that the device 302 can receive the sound made by a user wearing the device, and also transmit and/or attenuate the sound heard in the vicinity of the user for the user. The device 302 can include a machine learning algorithm, trained to predict whether a sound would trigger a negative reaction in a user hearing the sound. A processor of the device 302 can receive a signal representing a sound 304 detected by a sensor in the device 302. The processor may run a machine learning model, for example, a neural network, to identify that the sound triggers a negative reaction in a user hearing the sound. By way of examples, a machine learning model such as a neural network can be implemented and embedded as an AI chip, or can be programmed to run on the processor. The processor may automatically activate a preventive action to mitigate the reaction, e.g., responsive to the machine learning model predicting that the sound would trigger a negative reaction in the user. An example of a preventive action can include attenuating the sound or reducing the sound level such that the user wearing the device (e.g., headphone) does not hear the sound at the same intensity. Other examples of preventive actions such as those described above with reference to FIG. 1 and FIG. 2 can applied or activated. In an embodiment, a preventive action can be applied incrementally. For example, the entire sound need not be canceled all at once, but may include softening the sound by incremental level or amount iteratively until the user's reaction subsides. In this way, the processor can learn a tolerance level of the user and the user can become accustomed to a certain noise level.

The processor may also monitor the user's reactions, for example, by communicating with one or more devices 306 that can measure user's data such as the user's biometric data, user's facial expression, etc. For example, a camera on a user's smartphone may detect the user's facial expression, a user's wearable device may measure the user's heart rate, and/or other biometric data. Based on the monitoring, and responsive to determining that the user's reaction has been suppressed (e.g., the user's negative reaction to the sound has stopped), the processor may deactivate the preventive action. The information gathered from this session, e.g., the received sound, user's reaction to the (e.g., prior to the preventive action being activated) can be recorded and used as new training data to retrain the machine learning model or the neural network. In an aspect, monitoring of user reactions can be performed in opt-in or opt-out manner, for example, monitoring is performed with a permission of the user and/or guardian.

In an embodiment, such data can be transmitted to a remote computer server 310 for processing. In an embodiment, the computer server 310 may perform the retraining of the machine learning model and transmit the retrained machine learning model to the device 302 for subsequent use.

The device 302 may also pair itself with another user's device 308, so that, for example, that user's device may actively control the device 302 to perform one or more actions such as user reaction mitigating actions.

Figure 4:
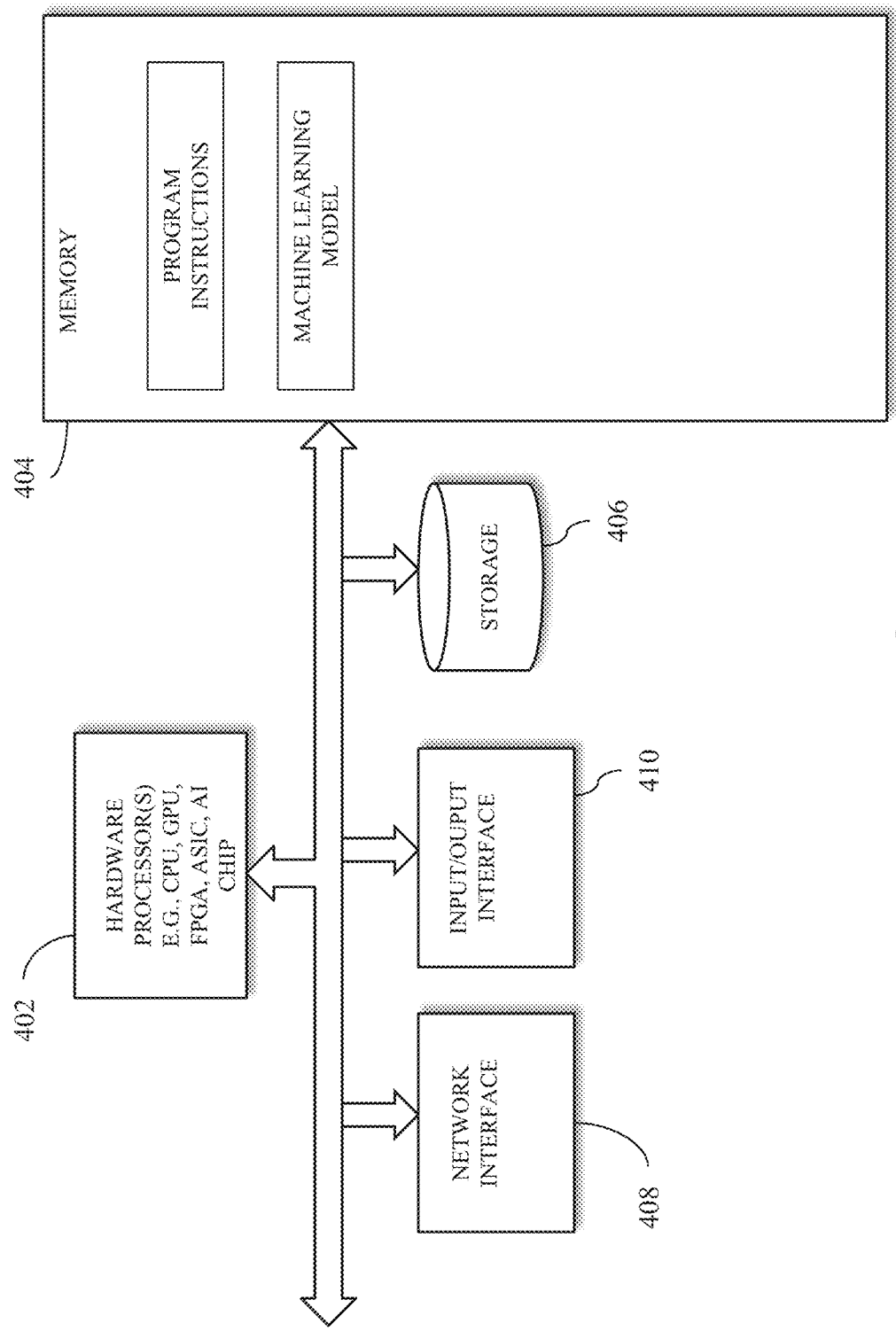
FIG. 4 is a diagram showing components of a system in one embodiment.

FIG. 4 is a diagram showing components of a system in one embodiment. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and prevent unwanted noise, for example, for user with noise sensitivity. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive signals representing sound, for example, in the environment or vicinity of a user. At least one hardware processor 402 may run a machine learning model such as a neural network to predict whether the sound would trigger a reaction (e.g., a negative reaction) in the user hearing the sound and activate one or more preventive actions to mitigate the user's reaction. At least one hardware processor 402 may monitor the user's reactions, e.g., continuously, e.g., by communicating to one or more other devices, which may measure the user's biometric or other data. Responsive to determining that the user's reaction has subsided or is suppressed, at least one hardware processor 402 may deactivate the preventive action. New training data can be constructed using the received sound signal data and the user's reaction to the sound. The machine learning model can be retrained using the new training data. In one aspect, at least one hardware processor 402 can be coupled with a storage device 406, e.g., for storing data associated with functioning of one or more hardware processors 402. At least one hardware processor 402 can also be coupled with a network interface 408, for example, for communicating with one or more remote devices, via one or more communications networks. Data can be temporarily loaded into a memory device 404 for at least one hardware processor 402 to perform its function. For instance, a learned or trained neural network may be stored on a memory device 404, for example, for execution by one or more hardware processors 402. At least one hardware processor 402 may also be coupled with an input/output interface 410 for communicating with input and/or output devices such as a keyboard, mouse, display, and/or others.

Figure 5:
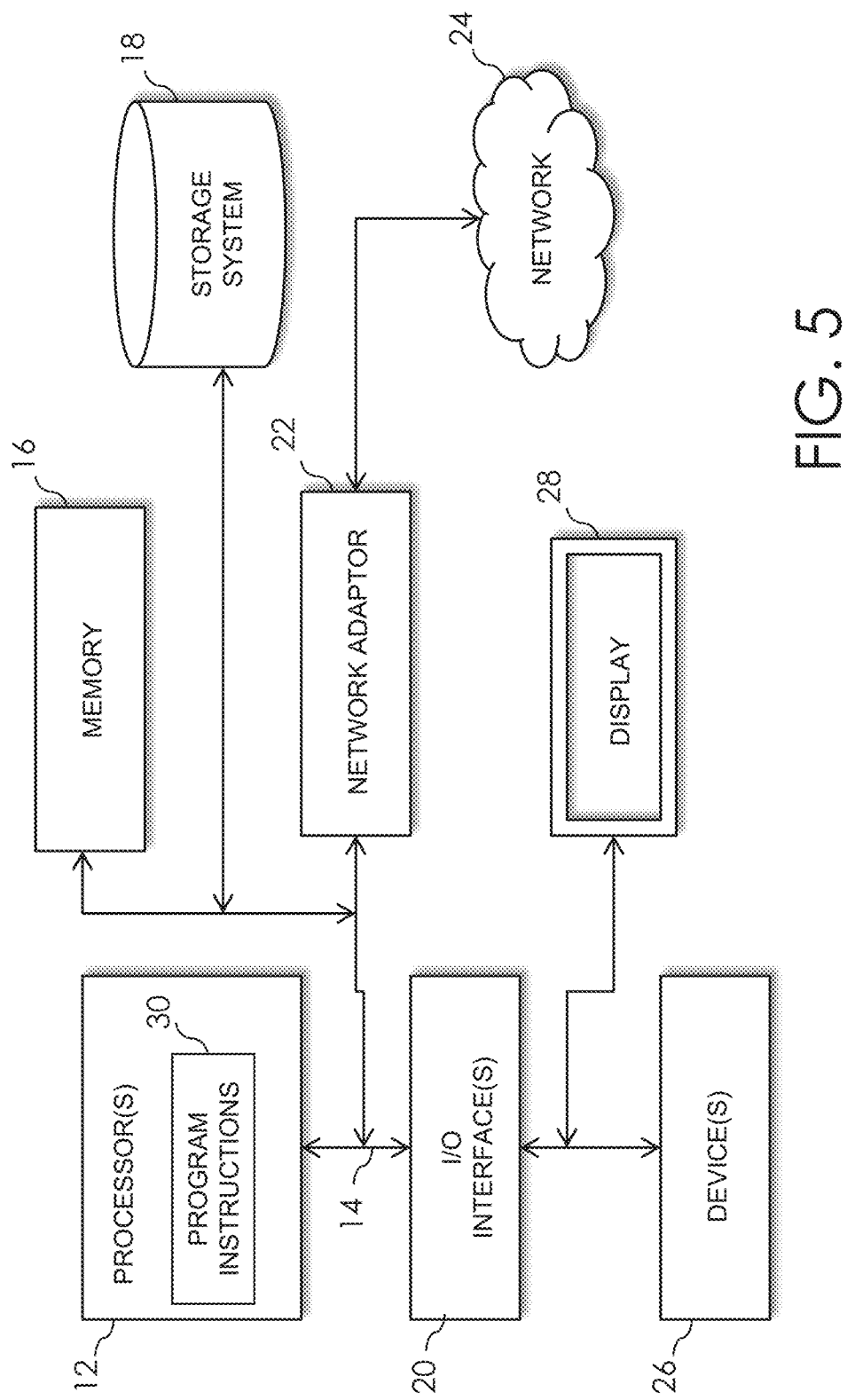
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs one or more methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a signal representing a sound detected in an environment;
running a machine learning model to identify, given the sound as input to the machine learning model, that the sound triggers a negative reaction in a user hearing the sound, wherein running the machine learning model provides as output of the machine learning model a determination of whether the sound would trigger the negative reaction;
automatically activating a preventive action to mitigate the negative reaction;
monitoring reactions of the user;
responsive to determining that the negative reaction has been suppressed, deactivating the preventive action; and
retraining the machine learning model using at least the signal as new training data.

2. The method of claim 1, wherein the machine learning model includes a neural network.

3. The method of claim 1, wherein the negative reaction includes the user's reactive sound.

4. The method of claim 1, wherein the negative reaction includes the user's biometric data.

5. The method of claim 1, wherein the preventive action includes attenuating the sound.

6. The method of claim 1, wherein the method further includes pairing a device performing the method with another device of another user.

7. The method of claim 1, wherein the preventive action includes controlling another device to perform another mitigating action.

8. The method of claim 1, wherein the preventive action is applied incrementally.

9. A system comprising:
a sensor device operable to detect signals representing a sound;
a processor coupled with the sensor;
the processor operable to at least:
receive a signal representing a sound in an environment detected by the sensor;
run a machine learning model to identify, given the sound as input to the machine learning model, that the sound triggers a negative reaction in a user hearing the sound, wherein running the machine learning model provides as output of the machine learning model a determination of whether the sound would trigger the negative reaction;
automatically activate a preventive action to mitigate the negative reaction;
monitor reactions of the user;
responsive to determining that the negative reaction has been suppressed, deactivate the preventive action; and
retrain the machine learning model using at least the signal as new training data.

10. The system of claim 9, wherein the machine learning model includes a neural network.

11. The system of claim 9, wherein the negative reaction includes the user's reactive sound.

12. The system of claim 9, wherein the negative reaction includes the user's biometric data.

13. The system of claim 9, wherein the preventive action includes attenuating the sound.

14. The system of claim 9, wherein the processor is further operable to pair with another device of another user.

15. The system of claim 9, wherein the preventive action includes controlling another device to perform another mitigating action.

16. The system of claim 9, wherein the preventive action is applied incrementally.

17. The system of claim 9, wherein the sensor device coupled with the processor includes a headphone.

18. A computer program product comprising a non-transitory computer readable storage medium having program instructions embodied therewith, the program instructions executable by a device to cause the device to:
- receive a signal representing a sound detected in an environment;
- run a machine learning model to identify, given the sound as input to the machine learning model, that the sound triggers a reaction in a user hearing the sound, wherein running the machine learning model provides as output of the machine learning model a determination of whether the sound would trigger the reaction;
- automatically activate a preventive action to mitigate the reaction;
- monitor reactions of the user;
- responsive to determining that the reaction has been suppressed, deactivate the preventive action; and
- retrain the machine learning model using at least the signal as new training data.

19. The computer program product of claim 18, wherein the machine learning model includes a neural network.

20. The computer program product, wherein the reaction includes the user's reactive sound.

* * * * *